May 9, 1944. O. S. PETTY 2,348,225
MAGNETIC SEISMOMETER
Filed Feb. 13, 1940
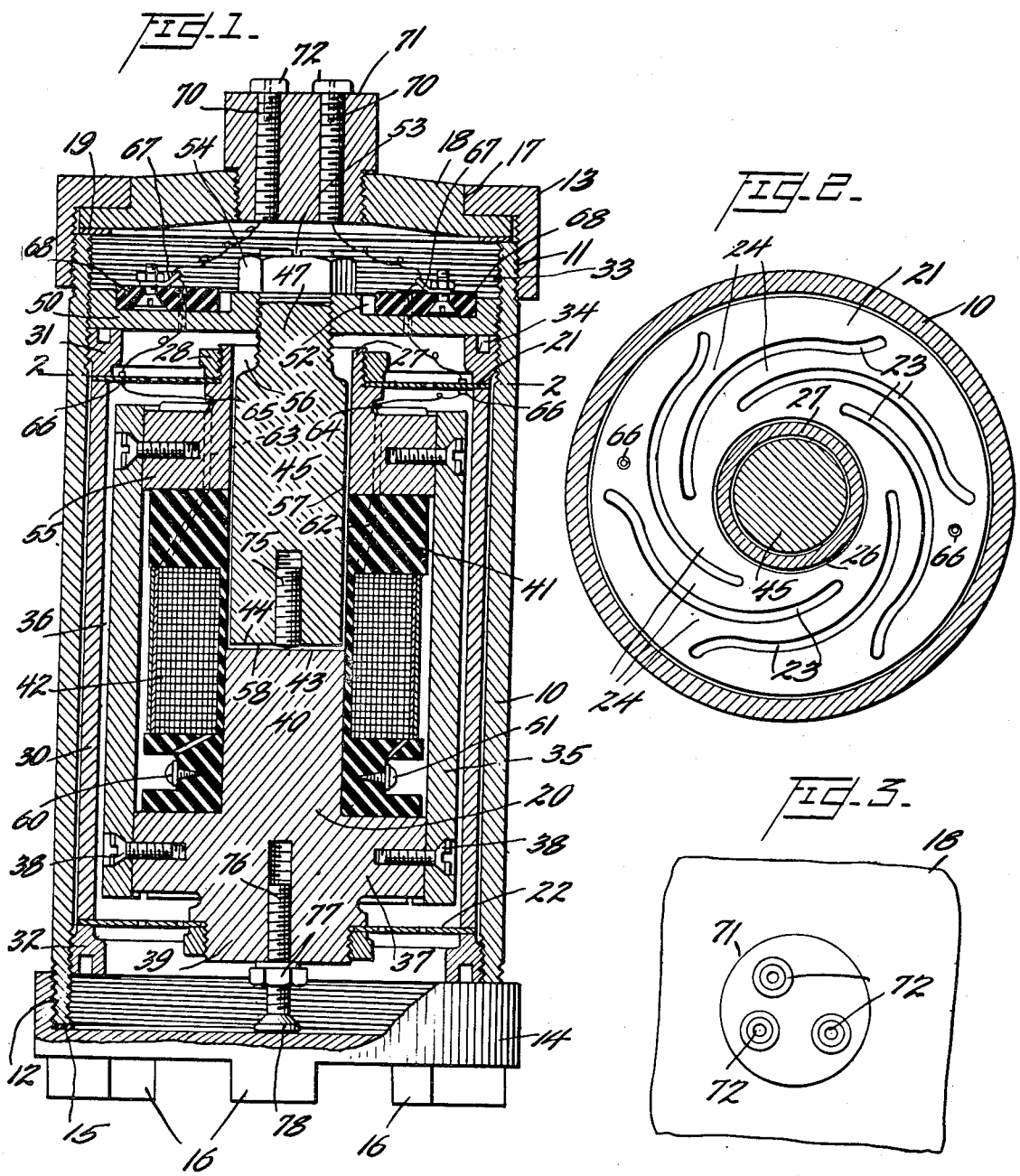
Inventor
Olive S. Petty
By Watson, Cole, Grindle and Watson
Attorneys Patented May 9, 1944

2,348,225

UNITED STATES PATENT OFFICE 2,348,225

MAGNETIC SEISMOMETER

Olive S. Petty, San Antonio, Tex.

Application February 13, 1940, Serial No. 318,739

7 Claims. (Cl. 177—352)

This invention relates to transducers and more particularly to devices for converting a portion of the energy of artificially generated seismic waves into electrical waves of definite relationship in time, amplitude, and shape to the initiating waves. Such devices are commonly referred to as seismometers or geophones.

Numerous types of seismometers have been devised and are in wide use in the work of geophysical prospecting where they are customarily used in plural to record, on a single chart, the reception of reflected or refracted seismic waves in the location of each of the seismometers, which waves may be artificially produced as by the explosion of a charge of explosive at some distance from the seismometer stations.

The manner of using seismometers and the circuits and computations involved is available in the literature and in the patented art and need not be discussed in the present application, which deals primarily with the structural features of one particular form of seismometer.

Prospecting seismometers in general may be divided into two classes, those intended to be actuated by the vertical components of earth waves and those intended to be actuated by the horizontal components of such waves. Some types are known which are capable of being used for either purpose at will. As a further classification, it may be considered that seismometers of either of the above types may be divided into sub-groups in accordance with the characteristic of the seismic wave to which they respond. Broadly, there are three groups in this classification, but there may be considerable overlapping. The basic sub-classifications are displacement actuated; velocity actuated; and acceleration actuated. The present invention deals primarily with devices falling into the latter two groups.

It is therefore an object of the present invention to provide a novel and improved seismometer of the velocity or acceleration type.

More particularly it is an object of the invention to provide a seismometer of the so-called magnetic type, the output voltage of which is generated as the result of changes in the reluctance of a magnetic circuit.

It is a further object of the invention to provide a magnetic type of seismometer in which the so-called steady mass, which is spring mounted in the casing, comprises the permanent magnet, its pole pieces, and the winding.

It is a still further object of the invention to make use of a hollow or tubular permanent magnet enclosing the winding and provided with pole pieces, one of which is perforated for the entrance of an armature into the magnet and coil and the other of which provides a pole tip for cooperation with the armature, whereby upon relative movement of the magnetic system and the armature, the air gap between this tip and the armature is varied and the change in the number of flux lines passing through the coil because of the change in reluctance of the magnetic circuit serves to generate a voltage more or less dependent upon the velocity of relative movement.

An important feature of the invention resides in the positioning of the variable air gap between the stationary and movable parts of the whole magnetic circuit near the longitudinal center of the winding for greater energy generation.

A further feature of the invention resides in the manner of suspending the movable system or steady mass from the casing to permit relative movement in one direction and prevent any lateral displacement, together with the use of a damping fluid which fills up the narrow gaps between relatively movable parts to offer the maximum damping, thereby eliminating the production of parasitic voltages at seismic wave frequencies which approach the fundamental or major harmonics of the natural frequency of the moving mass.

Other and further objects and features of the invention will be more apparent to those skilled in the art upon a consideration of the accompanying drawing and following specification wherein is disclosed a single exemplary embodiment of the invention with the understanding that such changes may be made therein as fall within the scope of the appended claims without departing from the spirit of the invention.

In said drawing:

Figure 1 is a longitudinal central section through a seismometer constructed according to the present invention;

Figure 2 is a transverse section taken on line 2—2 of Figure 1 and showing one of the diaphragm springs; and Figure 3 is a plan view of the seismometer showing the electrical connection plug.

Seismometers falling into any of the earlier enumerated main or sub-classifications are often used in extremely wild country and must be handled manually and carried long distances. Since numbers of them are used at one time, the value of small size and rugged construction will be readily appreciated. The handling of a number of these devices and their transportation over considerable distances where the going is bad is a heavy burden on the operator who places them in position since he is also encumbered with the necessary cables for connecting them each back to the amplifying and recording station. The magnetic type of detector possibly offers the best facilities for reducing size and weight without decreasing the ruggedness of construction nor reducing the important operating characteristics. In accordance with the present invention a magnetic type detector has been devised in which the steady mass requires no dead weight which is not an effective part of the magnetic circuit. Thus there is but a small portion of the whole apparatus which is not in effective use when the device is in operation.

The ideal type of seismometer would have the steady mass remain stationary, while the seismic waves moved only the case which should be as light as possible. In the seismometer of the present invention the case and all members rigidly connected thereto are reduced to an absolute minimum in number and weight and all of the magnets, coils, etc., are formed into the steady mass. The use of a large weight for the steady mass permits an increase in the stiffness of the spring for sustaining the same while yet maintaining the period of vibration of the steady mass at the desired value. A stiff spring is desirable in order to overcome any tendency toward sticking between the armature and the pole piece as will be explained in greater detail subsequently. The stronger supporting spring provides additional force to restore the steady mass after a displacement so that any tendency toward binding or over-damping from vacuum effects is more readily overcome. Also there is less opportunity for damage to or misadjustment of the instrument due to transportation shocks.

Referring now to the drawing for a better understanding of the seismometer, there is shown at 10 a tubular casing which may be a section of non-magnetic pipe or tubing of brass, aluminum or some suitable alloy. Both ends are cut off square and threaded externally as shown at 11 and 12, the former to receive the cap ring 13 and the latter the base cap 14 which, with the assistance of a gasket 15, seals the lower end of the casing. Suitable feet 16 may be formed integral with the base cap if desired. The upper ring 13 engages in a rabbeted circumferential channel 17 in the top cap 18 to clamp it in position to form a water-tight closure for the upper end of the casing tube, a gasket 19 being interposed between the cap and the end surface of the tube. This separation of the cap and its locking ring permits removal of the cap without rotation so that the conducting wires which lead to the cap are not twisted off.

A combined magnetic system and steady mass 20 occupies substantially all of the space within the casing and is adapted for longitudinal movement relative thereto. It is suspended within the casing and prevented from lateral movement in respect thereto by means of a pair of diaphragm springs 21 and 22, respectively, arranged at the upper and lower ends of the steady mass. The upper one of these springs is seen in Figure 2 and comprises a thin sheet of suitable material such as phosphor bronze (because of its non-rusting properties) which is preferably etched out to provide a plurality of shaped slots 23 defining the curved spokes or arms 24 extending from the continuous, annular peripheral portion of the diaphragm to the continuous, annular intermediate portion thereof adjacent the central hole 26 which fits over a threaded stud 27 on the steady mass and is clamped in position against a shoulder thereon by means of lock nut 28. Similar means for mounting the lower spring on the steady mass is illustrated in Figure. 1. Etching to provide the slots in the diaphragm springs is resorted to in an effort to eliminate all strains in the spring which might cause drifting with age and other undesirable conditions.

The peripheral portions of the diaphragm springs are clamped in the casing by means of a non-magnetic spacer sleeve 30 and a pair of locking rings 31 and 32. One of these rings, for instance that at the top, is threaded into position by engagement with the inner threads 33 at the upper end of the tube 10, use being made of a spanner wrench to engage in the sockets 34 in the upper end of the ring for manipulating the same. Previously, the spacer sleeve 30 has been assembled about the steady mass and between the two diaphragms thereon and this assembly is now slipped into position through the open bottom of the casing tube and finally the ring 32 is screwed into position in the same manner as the ring 31, locking the assembly in place and providing continuous peripheral support for the outer edges of both diaphragms. Although a slight clearance is seen in the drawing between the sleeve 30 and the casing tube 10, this is merely for convenience in showing. Actually the fit is extremely close to prevent any relative movement of the two tubes. The locking rings and particularly the upper one may be either of magnetic or non-magnetic metal to give certain desired characteristics to the magnetic circuit as will be later described. Likewise it may be found desirable to form at least one of the diaphragms from magnetic material.

The magnetic system constitutes substantially the whole of the steady mass. Its major element is the tubular, permanent magnet 35 or a plurality of separate bar magnets of a length just slightly less than the vertical distance between the diaphragm springs and of a diameter to provide only the necessary working clearance 36 between its outer surface and the inner face of the spacing sleeve 30. This magnet is made of appropriate magnetic material to provide the desired field intensity in the air gaps later to be described. The lower end of the magnet is closed by the soft iron pole piece 37, the flange portion of which is finished to provide an extremely close fit within the magnet end and which is attached thereto by means of radial screws 38. The lower end of this pole piece is reduced in diameter to provide the stud 39 to which the lower diaphragm spring is attached, while the upper end is reduced to provide a plug or pole tip 40 of such a diameter as to receive the insulating spool 41 which carries the electric winding or coil 42. This pole tip 40 has a flat, horizontal end face 43 positioned at substantially mid-length of the tubular magnet for cooperation with a correspondingly shaped and slightly smaller sized face 44 of a bar or core armature 45.

This armature is formed from a bar of soft iron having a diameter just slightly less than that of the pole tip 40 so as to have working clearance in the opening through the center of the spool. The reduced upper end 47 of the armature is threaded for cooperation with internal threads in an armature supporting disc 50 made of a magnetic metal threaded on its periphery to engage with the internal threads 33 in the casing tube 10. It is tightly screwed down on top of the locking ring 31 and its upper surface is provided with an annular groove 52 for a purpose later to be described. A slot 53 in the upper end of the reduced portion of the armature permits a screw driver to be inserted for adjusting its vertical height to change the air gap between the faces 43 and 44, as will be later described, and a lock nut 54 cooperating with the upper face of the supporting disc 50 holds it in adjusted position.

The upper end of the permanent magnet is substantially closed by the pole piece 55 fitted in the end in the same manner as the lower pole piece and providing the hollow boss 27 to receive the lock nut 28 for positioning the upper diaphragm spring. This pole piece is drilled centrally and longitudinally as at 56 to provide a close working but otherwise minimum clearance between its walls and the exterior surface of the armature 45 whereby the magnetic system may have movement relative to and over the armature. This minimum clearance reduces the air gap in the closed magnetic circuit involving the armature, the upper pole piece, the permanent magnet, the lower pole piece, and the pole tip. The annular air gap 57 just described does not change in size and hence does not vary the reluctance of the magnetic circuit upon relative movement of the magnetic system in respect to the armature due to seismic waves. Moreover this gap may be shunted by a magnetic circuit comprising the upper diaphragm, the lock ring 31, the armature supporting disc 50, and the armature 45. However, changes in the main or variable air gap 58 between the face 43 of the pole tip and the lower face 44 of the armature effect a material and rapid change in the reluctance of the magnetic circuit and hence in the number of flux lines linking the coil.

Changes in the number of flux lines linking the coil generate an electric voltage in the winding. The winding 42 comprises a suitable number of turns of appropriate size wire to generate sufficient voltage and current to permit the same to be conducted from the seismometer over distances such as used in seismic prospecting to an amplifier where the alternating current pulsations can be amplified to an appropriate level for the operation of any conventional form of recorder such for instance as a reflecting or string galvanometer controlling light projected onto a moving photographic film for making a permanent record.

In the construction shown in Figure 1 the inner end of the winding is brought through a suitable opening in the spool to a terminal 60 in an annular groove near the bottom of the spool, while the outer end of the winding is brought to a similar terminal 61. From these terminals flexible cabled conductors are passed along the outer surface of the winding, through passages 62 in the upper flanges of the spool and passages 63 in the pole piece 55. They emerge close to the undercut channel 64 near the base of the stud 27 where they may be tied down as shown by threads 65. They then extend almost radially to pass through the insulated openings 66 in the diaphragm, thence through perforations in the armature support disc 50 to be secured to terminals 67 mounted on the insulation blocks 68 secured in the previously mentioned annular channel in the upper face of the armature support disc 50. Separate wires lead from these terminals to the screws 70 mounted in the insulation plug 71 threaded into a central aperture in the cap 18.

The upper ends of the screws are socketed as shown at 72 for the reception of appropriate connector plugs, several of which may be mounted in one base, not shown, for cooperation with the three socketed terminals on the plug 71. A third one of these terminals is grounded to the case of the seismometer and is used to connect into a circuit serving to eliminate as largely as possible static disturbances and magnetic pick-up from nearby power lines, sources of terrestrial magnetism, and the like. The armature 45 has an adjustable non-magnetic screw 75 protruding through its lower face to limit the minimum size of the air gap 58 upon the occurrence of exceptionally large seismic shocks or other shocks such as it might receive in transportation, etc. This prevents the complete closure of the air gap and the generation of voltages of such excess proportions as likely to damage the recording equipment. Another important feature of this construction will be discussed later. Likewise the gap is prevented from opening too wide which might strain the supporting diaphragms by means of a stop screw 76 adjustably threaded into the lower pole piece stud 39 and secured by a lock nut 77. The head 78 cooperates with the upper surface of the base cap 14 to limit downward movement of the steady mass.

The diaphragm springs are mounted so that the curved spokes on the upper one extend in the opposite direction to those on the lower one so that there is thus counteracted any tendency to rotation as the springs are flexed. Diaphragm springs have naturally a relatively high fundamental frequency. The two springs may be of different thicknesses, if necessary, in order to have different natural frequencies so as to eliminate so far as possible any tendency to resonance.

It is often desirable that the fundamental frequency of the steady mass, as sprung, be close to that of the reflected seismic waves. These usually have frequencies varying from 20 to 70 cycles per second. The steady mass can readily be made to respond to this range by the construction shown where substantially all of the magnetic circuit forms a part of the steady mass and the relatively light armature and casing are moved in respect thereto by the vertical components of the seismic waves. In order to prevent persistence of vibration, rather high damping approaching the critical is desirable, under some modes of operation of the seismometer. There is a certain effective damping resultant from the operation of the magnetic circuit and which may be credited partly to hysteresis in the magnetic parts and partially to electrodynamic reactions, but this may be found to be insufficient for proper operation and further damping is sometimes introduced by filling the casing with an appropriate fluid, the viscosity of which is selected for the purpose.

Where it is found necessary to use a damping fluid one must be selected with a suitable initial viscosity and a temperature coefficient of viscosity which offers but slight changes throughout the wide range of temperatures likely to be encountered in field service.

It is found, however, that certain features inherent to the magnetic circuit construction just described may supply all of the necessary damping to permit operation of the seismometer under the most trying conditions encountered. Such operation may produce what is almost the equivalent of critical damping and substantially aperiodic suspension of the steady mass. One feature contributing to this improved operation is the use of the non-magnetic bumper screw 75 previously referred to, for it permits the variable air gap 58 to be adjusted to such a small value, without the possibility of sticking, that the magnetic attraction between the pole faces 43 and 44 will vary in such a manner, with the assistance of the fixed air gap 57, as to nearly offset any increase of the restoring force of the diaphragm springs over an operating range where it is feasible to work.

This constitutes a decided improvement over the prior art since if the ground movement is not larger than this range, over which the increase or decrease of the restoring force of the diaphragm springs due to movement of the case with respect the steady mass is only slightly greater than the decrease or increase of the magnetic attraction between the poles, then the so-called steady mass will be very nearly a true steady mass. This is because there remains only an extremely small net restoring force acting on the steady mass, in comparison to the restoring force which would exist if the poles were not set at this critical spacing. This small restoring force makes the seismometer extremely sensitive because the steady mass remains more nearly at rest than it would if the net force thereon from movement of the case was greater. Therefore, the relative displacement between the case and the steady mass is greater for any given shock and more energy is generated.

The above mode of operation will also tend to lower the period since if the restoring force were zero and the steady mass finite the device would have a period equal to infinity or a frequency of zero. Such a device then would be a pure velocity responsive device.

As a result of the above it will be seen that since the force attempting to set the steady mass in motion is small, any energy transmitted into the spring system will likewise be small and therefore the energy required to critically damp the system need not be large. It may be found that air in the casing in the small air gaps and other places will be adequate.

The bumper screw 75 as previously set forth, makes it possible to handle the seismometers or to let them be subjected to heavy seismic shocks which would normally move the pole faces 43 and 44 so close together that the magnetic attraction would be greater than the restoring forces of the diaphragm springs and the magnetic poles would completely close and stick permanently. Another feature contributing to the lack of sticking, even though the air gap gets very small, is the use of the fixed air gap 57 between the armature and the upper pole piece. The reason for this is as follows: If the reluctance of this gap 57 is, for example, approximately one-tenth that of the repose setting of the variable air gap 58, then for normal variations of this latter gap there would be about 10% loss in the effectiveness of the magnetic circuit due to this fixed gap. However, upon close approach of the pole faces 43 and 44 the variable gap might have only a fraction of the reluctance of the fixed air gap, for example, one-fourth, and thus reduce the pole strength across the variable air gap to one-fifth of what it would have been in the absence of the fixed air gap. Since the attractive force between the poles of a magnet can be expressed by the equation $$\frac{m^1 m^2}{d^2}$$

then with similar or equal poles the force of attraction is proportional to the square of the pole strength. Since the pole strength across the variable gap is assumed to be one-fifth of what it would have been in the absence of the fixed gap, the attraction between the variable poles would be only one twenty-fifth of the value which would exist if the fixed air gap were not present. Thus the variable air gap can be operated with much closer spacing and hence greater sensitivity and greater stability without the possibility of sticking because of the presence of the fixed air gap.

If it is not desired to operate with the characteristics just described the effect of the fixed air gap can be to some extent eliminated by using a magnetic locking ring 31, a magnetic upper spring 21, and magnetic armature support 50 which provides additional circuits paralleling the air gap 57 and reducing its effect.

Having thus described the invention, what is claimed as new and desired to be secured by Letters Patent is:

1. A magnetic seismometer of the vertical displacement type, including in combination, a casing, an armature bar fixedly disposed therein for vertical positioning, a hollow moving system for cooperation with said bar by movement relative thereto and thereover, means suspending said system for vertical movement relative to said bar, said system including a coil, a tubular permanent magnet surrounding said coil and at least a portion of said armature, a pole piece carried by said magnet and having a face closely spaced from the confronting end of said armature, the confronting faces of said armature and pole piece being positioned to provide an air gap midway of the length of said coil for generation of maximum voltage therein upon relative movement of said system and armature, said suspending means providing insufficient sustaining effort for said system and the magnetic attraction across said gap augmenting said effort to provide proper suspension and to reduce the restoring force to lower the natural frequency of the system.

2. A magnetic seismometer having in combination, a tubular casing, an armature fixed coaxially therein, a steady mass mounted in the casing and for movement relative to the casing and armature, said steady mass comprising only a permanent magnet, pole pieces therefor and a coil, and diaphragm springs connecting said relatively movable parts, said springs having different natural frequencies of vibration.

3. A seismometer as claimed in claim 2 in which the permanent magnet is tubular and houses the pole pieces and coil.

4. A seismometer as claimed in claim 2 in which the permanent magnet is tubular and houses the pole pieces, coil and armature.

5. A magnetic seismometer for generating voltages in response to the velocity or acceleration of seismic waves comprising a casing, an armature bar fixed at one end to said casing, extending inwardly toward the center thereof and having a pole face at the free end thereof, a system in said casing arranged for relative movement longitudinally of and partially over said armature and including a tubular permanent magnet, a pole piece closing the end of said magnet opposite said armature and having a pole tip extending into close confronting proximity to said face, a wire coil carried by said system and closely surrounding said tip and a portion of said armature, a second pole piece closing the space between the opposite end of said magnet and the walls of said armature, and providing an annular gap of fixed size in the magnetic circuit, and a diaphragm spring of magnetic material supporting said system and providing a shunt to said gap.

6. A magnetic detector including a closed end tubular casing, a spacer sleeve closely fitting said casing, circular diaphragm springs each having its periphery bearing against one end of said sleeve, lock rings engaging the casing and clamping the springs against the sleeve, a steady mass extending between said springs and substantially filling said sleeve, and an armature passing through one of said springs and entering said steady mass.

7. In an instrument for geophysical prospecting in combination, a casing, a steady mass, a substantially flat diaphragm spring suspending said mass from the casing for relative movements, said spring comprising a sheet metal plate having portions removed to provide curved arms extending from near the center to near the periphery of the plate, said portions being removed by etching to insure against strains in the spring.

OLIVE S. PETTY.